United States Patent [19]

Bisch

[11] Patent Number: 4,965,903
[45] Date of Patent: Oct. 30, 1990

[54] MODULAR BRIDGE

[75] Inventor: Christopher G. Bisch, Elmira, Canada

[73] Assignee: Kitchener Forging Ltd., Kitchener, Canada

[21] Appl. No.: 386,453

[22] Filed: Jul. 27, 1989

[30] Foreign Application Priority Data

Feb. 17, 1989 [CA] Canada ................................. 591424

[51] Int. Cl.$^5$ .............................................. E01D 1/00
[52] U.S. Cl. .......................................... 14/1; 14/14; 52/285
[58] Field of Search ...................... 14/1, 2.4, 3, 13, 14; 52/285, 585, 726; 403/174, 178

[56] References Cited

U.S. PATENT DOCUMENTS

| 159,046 | 1/1875 | Shaw | 14/14 |
|---|---|---|---|
| 3,381,428 | 5/1968 | Sillman | 52/285 X |
| 3,640,557 | 2/1972 | Nute, Jr. et al. | 52/726 X |
| 4,002,261 | 1/1977 | Litchfield | 52/285 X |
| 4,159,758 | 7/1979 | Courson | 52/726 X |
| 4,437,280 | 3/1984 | Collier | 52/285 |
| 4,569,167 | 2/1986 | Staples | 52/285 X |

FOREIGN PATENT DOCUMENTS 2120340 12/1971 Fed. Rep. of Germany ........ 52/726

Primary Examiner—William P. Neuder
Attorney, Agent, or Firm—Basile and Hanlon

[57] ABSTRACT

A modular bridge comprising two end modules adapted for connection to respective end footings, a plurality of side railings adapted for modular interconnection in two parallel rows between the end modules, adjacent ones of the side railings being connected via interlocking splices, a plurality of floor beams arranged orthogonally between the two rows of side railings, and a structural connection for securing respective ones of the floor beams to corresponding ones of the side railings. The interlocking splices preferably each comprise a plurality of ribs disposed within respective ends of adjacent ones of the side railings for defining respective slots therebetween, a plurality of plates adapted for insertion into the respective slots, and apparatus for securing the plurality of plates within the respective slots.

10 Claims, 6 Drawing Sheets

MODULAR BRIDGE

This invention relates in general to modular bridges, and more particularly to an interlocking splice for connecting hollow structural tubing sections such as those found in modular bridges.

The development of modular pedestrian and small vehicular bridges was spearheaded during World War I by military engineers, and is exemplified by the well known Bailey Bridge. The prior art Bailey Bridge is of modular construction using clevis and hinge attachments of modular side railing sections secured via bolts and pins.

Additional well know prior art modular bridges are disclosed in U.S. Pat. Nos. 3,411,167 (Sedlacek); 4,520,523 (Fitzgerald-Smith et al); and 4,665,830 (Anderson et al).

U.S. Pat. No. 267,189 (Godman) discloses a modular bridge wherein successive chords of the bridge are spliced by inserting a block between respective chord members and fastening the chord members and block together via several bolts. The block functions to strengthen the splice in relation to compression forces. However, the splice cannot be used in the bottom chord which is under tension. Instead, metal rods and bars are used to accommodate the tensile forces in the bottom chord.

A further prior art modular bridge is disclosed in U.S. Pat. No. 2,024,001 (Hamilton). The Hamilton patent teaches a plurality of generally U-shaped chord members connected via corresponding plates overlying respective ends of the cord members and secured thereto via bolts. The chord members are further bolted to a gusset plate for additional stability.

A similar modular bridge construction is shown in U.S. Pat. No. 384,196 (Duval) wherein a plurality of chords are placed in a line with their ends abutting, plate iron jaws being riveted to the web of the chords such that the jaws of each bar enclose the web of the adjacent bar and are secured via pins inserted through both sets of jaws. The jaws at one end of each chord are cooperatively dimensioned to engage the female jaws at the opposite end of the adjacent chord.

Also, whereas the modular connection of adjacent chord members disclosed in the U.S. Patents of Godman and Duval provide adequate strength and stability for bridge construction, the connection is severely lacking in aesthetic visual effect. In particular, all of the plate or insert elements as well as the connecting bolts and nuts are clearly visible to an individual using the bridge.

Aesthetic visual appeal is an increasingly important criteria for pedestrian and small vehicle bridges erected in pastoral settings such as parks and golf courses. Thus, it is an object of an aspect of the present invention to provide a bridge construction which offers high stability construction along with visually attractive appearance.

According to an aspect of the present invention, a modular bridge is provided constructed from hollow tubing in which successive chord lengths of the hollow tubing are spliced together via an internal interlocking finger arrangement with minimal external features, resulting in a visually aesthetic pleasing effect. The structure of the bridge according to the present invention is particularly useful as a pedestrian or small vehicle (e.g. golf cart) bridge suitable for use in pastoral settings such as parks, golf courses, etc.

According to another aspect of the present invention, there is provided a modular bridge comprising two end modules adapted for connection to respective end footings; a plurality of side railings adapted for modular interconnection in two parallel rows between the end modules; adjacent ones of the side railings being connected via respective interlocking splices; a plurality of floor beams arranged orthogonally between the two rows of side railings; and means for connecting respective ones of the floor beams to corresponding ones of the side railings. Each of connecting means comprises at least one horizontal support member extending from each one of the side railings at the interlocking splice for supporting a corresponding one of the floor beams thereacross, whereby each of the adjacent ones of the side railings support a portion of the corresponding floor beam along a centre line load at the interlocking splices yielding high lateral stability of the floor beam.

In accordance with another aspect of the present invention, there is provided a splice for connecting two ends of hollow tubing, comprising a plurality of ribs within each of the two ends of hollow tubing for defining respective slots therewithin; a plurality plates adapted for insertion into the respective slots within each of the two ends of hollow tubing; and means for securing the plurality of plates within the respective slots, whereby the plurality of plates form an arrangement of interlocking fingers relative to the respective slots for providing a rigid connection between the two ends of hollow tubing.

U.S. Pat. No. 320,079 (Martin) discloses a splice for beams or joists wherein each beam or joist is comprised of a central portion of timber and exterior rib of metal substantially but not entirely enclosing the upper surface of the timber. The splice consists of a pair of plates bolted or riveted to one end section internally of the plate but externally of the timber block and extending within the adjacent section and bolted or riveted thereto, thereby forming a sandwich splicing effect.

The use of two materials (e.g. timber and metal) results in a combination of unified strength in which the metal exterior is used to clad the timber core. The interior core of timber provides stability and receives the fasteners.

Whereas the patent of Martin discloses the use of a pair of plates inserted and riveted into opposite ends of a beam or joist for forming a splice, the patent fails to teach or suggest the use of a plurality of ribs within each end of the hollow tubing in accordance with the present invention as described above. the plurality of ribs in the present invention results in increased stability over prior art systems and is visually inconspicuous as discussed above.

A preferred embodiment of the present invention will be described in greater detail below with reference to the following drawings, in which.

Figure 1:
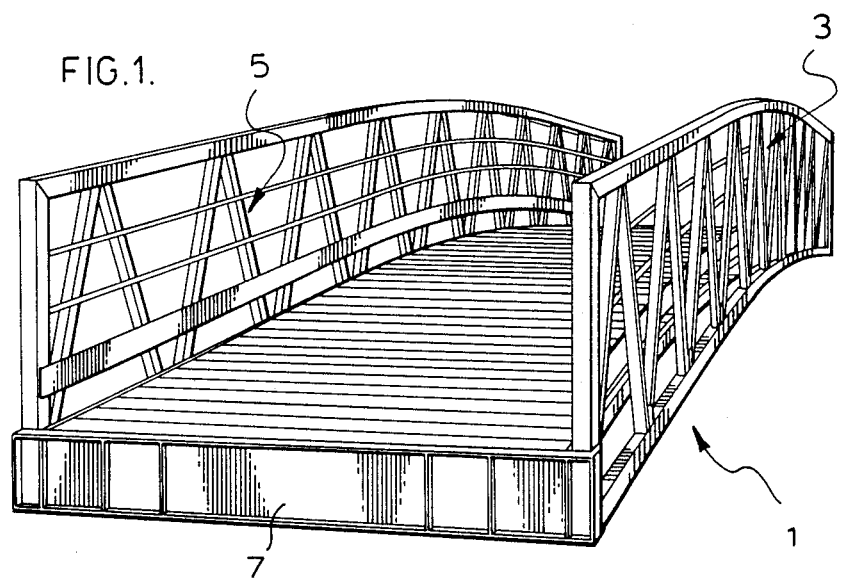
FIG. 1 is a perspective view of a fully assembled modular bridge in accordance with the present invention.

Turning to FIG. 1, a modular pedestrian bridge 1 is shown comprising a plurality of modular connected side railings 3 and 5 connected between end modules 7 and 9 which, when installed, are connected to respective end footings (not shown) via respective hinges such as 11.

The modular sections of side railings 3 and 5 may be fabricated to any suitable length. Typical sections contemplated are 5 feet, 10 feet, 15 or 20 feet in length.

Figure 2:
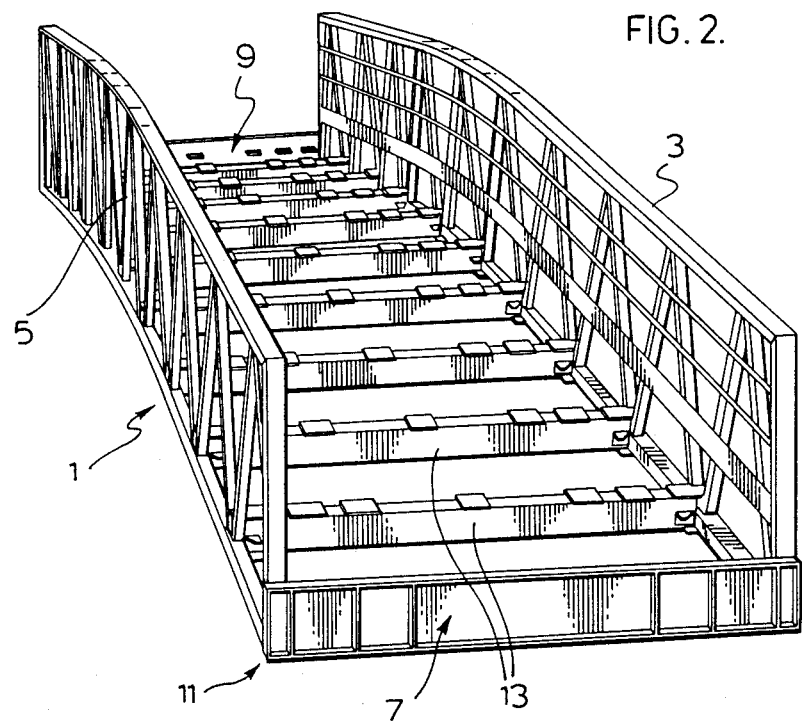
FIG. 2 is a perspective view of the bridge shown in FIG. 1 prior to installation of floor boards and stringers.

FIG. 2 shows the bridge 1 prior to installation of floor boards and stringers. As can be seen from FIG. 2, respective ones of the modular side railings 3 and 5 are also connected via a plurality of beams 13 extending therebetween.

Figure 3:
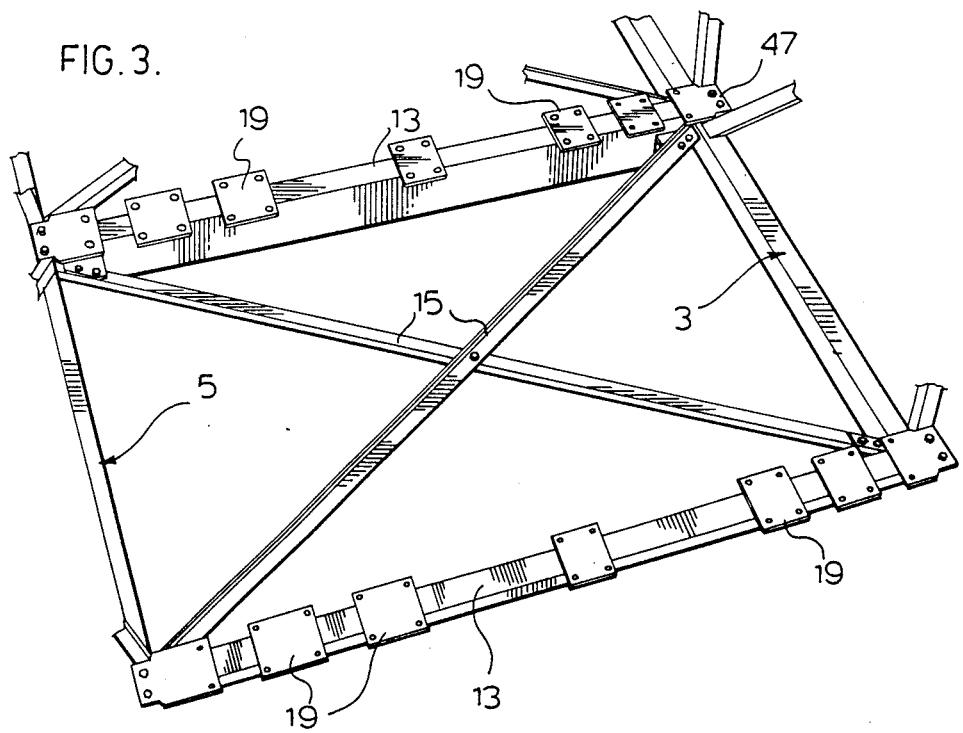
FIG. 3 is a detailed perspective view of diagonal supporting braces for the bridge shown in FIG. 1.

FIG. 3 illustrates a subsequent assembly step by which diagonal supporting braces 15 are connected between respective ones of he side railings 3 and 5 and the beams 13.

Figure 4:
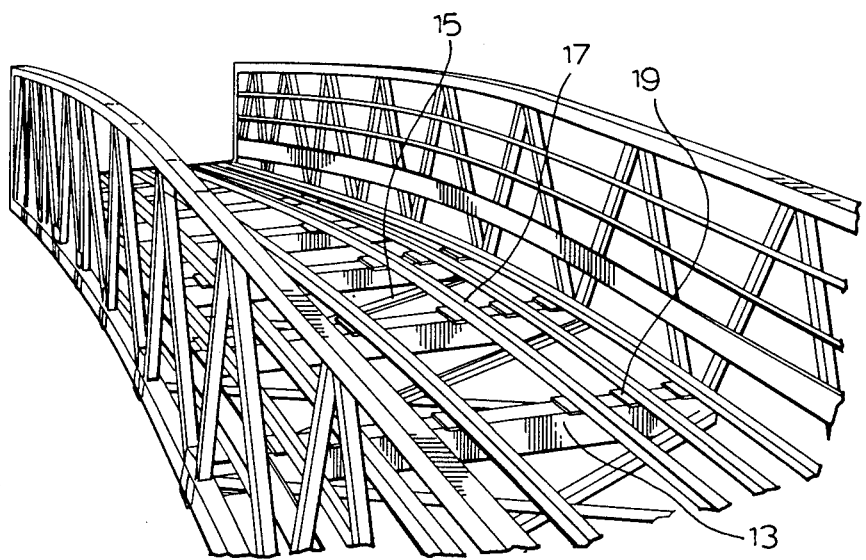
FIG. 4 is a perspective view of a portion of the bridge shown in FIG. 2 after installation of the stringers.

Next, as shown with reference to FIG. 4, longitudinal stringers 17 are secured to the beams 13 along respective supporting plates 19 of the beams.

Figure 5:
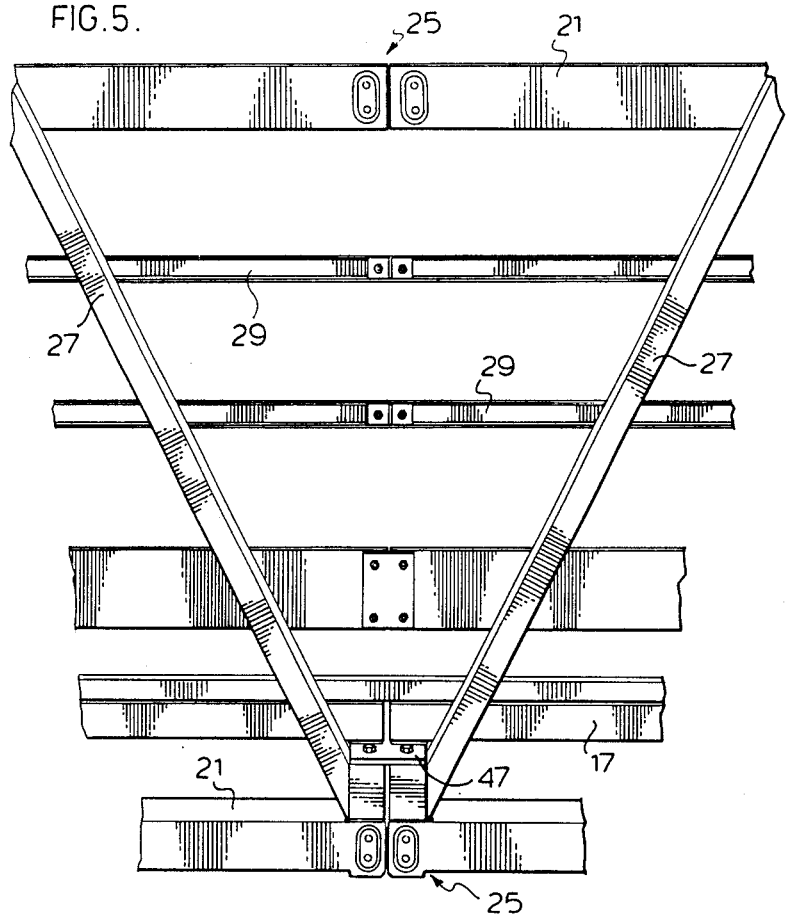
FIG. 5 is a side elevation view of a splice in the bridge of FIG. 1.

Turning to FIG. 5, successive ones of the modular side railings 3 are shown comprising top and bottom chord members 21 and 23 connected via splices 25. Diagonal members 27 and horizontal members 29 provide additional support.

Figure 6:
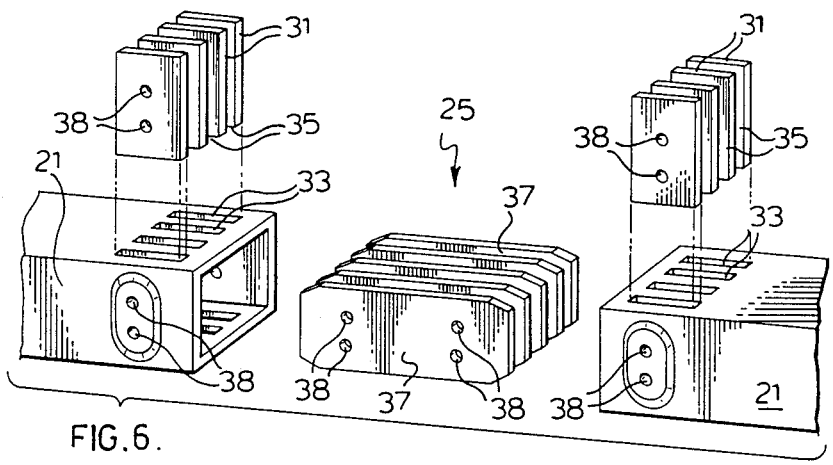
FIG. 6 is a perspective diagrammatic view of the splice shown in FIG. 5.
Figure 9:
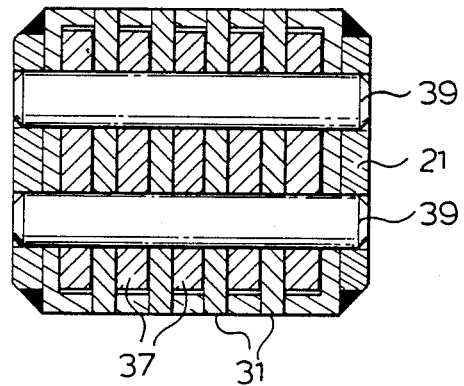
FIG. 9 is a section view of along lines 9—9 in FIG. 7.

The splice 25 is shown in greater detail with reference to FIG. 6 comprising a plurality of plates 31 forming ribs which are inserted into corresponding slots thereby 33 at the distal ends of the chord members 21. The plates or ribs 31 are welded into place within the slots 33 forming a plurality of additional slots 35, as shown in greater detail with reference to FIGS. 9 and 10. An additional plurality of plates 37 have tapered ends for insertion into corresponding ones of the slots 35. Each of the chord members 21 and ribs 31 have a pair of holes 38 extending completely therethrough, and each of the plates 37 include two like pairs of holes adapted to align with the of holes 38 in each of the chord members 21 and ribs 31 adapted to be spliced together.

According to a successful prototype of the invention, the plates 37 were approximately eight inches in length and approximately 31 inches in height and approximately ⅜ inch thick. Each of the plurality of ribs 31 was approximately 21 inches in length by approximately 5 1/16 inches thick. The holes 38 were each approximately ¼ inch in diameter.

Upon insertion of the plates 37 into the slots 35 defined by ribs 31 in opposite ends of the two chord members 21 being spliced together, two pairs of pins 39 are hammered through the corresponding aligned pairs of holes.

Alternatively, for larger bridge structures a correspondingly larger splice 25 may be provided having three or more holes 38 and pins 39 per side of the splice. Likewise, the dimensions of the chord members 21 (or other tubing members) and plates 37 may be increased or decreased depending on a particular application.

Figure 7:
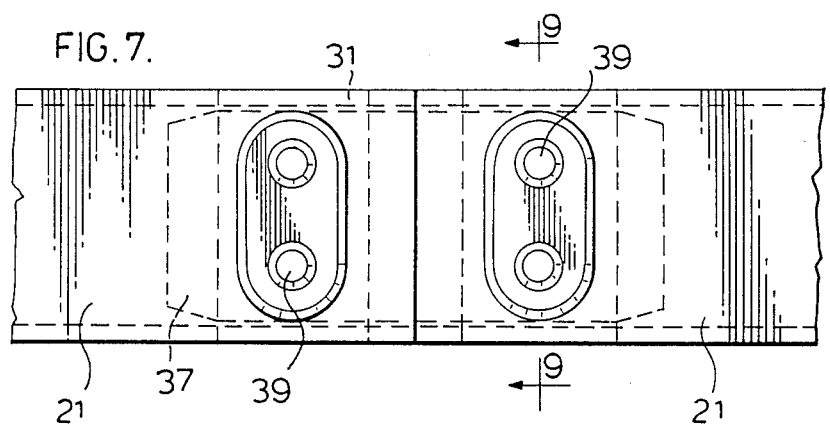
FIG. 7 is a detailed elevation view of the splice shown in FIG. 6.
Figure 8:
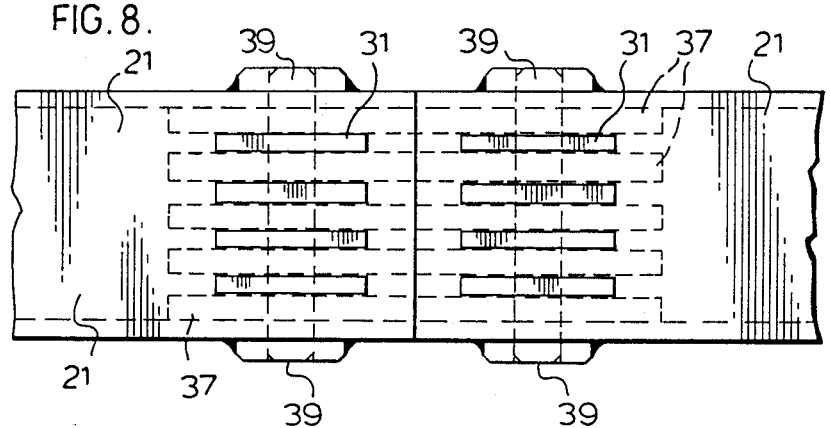
FIG. 8 is a plan view of the splice as shown in FIG. 4.

The series of interlocking plates 37 and ribs 31 form a solid and extremely stable splice between sections of the hollow tubing chord members 21 for maintaining structural integrity throughout the chord members 21, thereby overcoming lateral stability problems inherent in prior art splices. As shown with reference to FIGS. 7-9, opposite sides of the chord members 21 are provided with a protruding oblong portion 41 for accommodating the pairs of holes 38 and pins 39, resulting in a visually attractive appearance and devoid of large nuts and bolts, etc.

Figure 10:
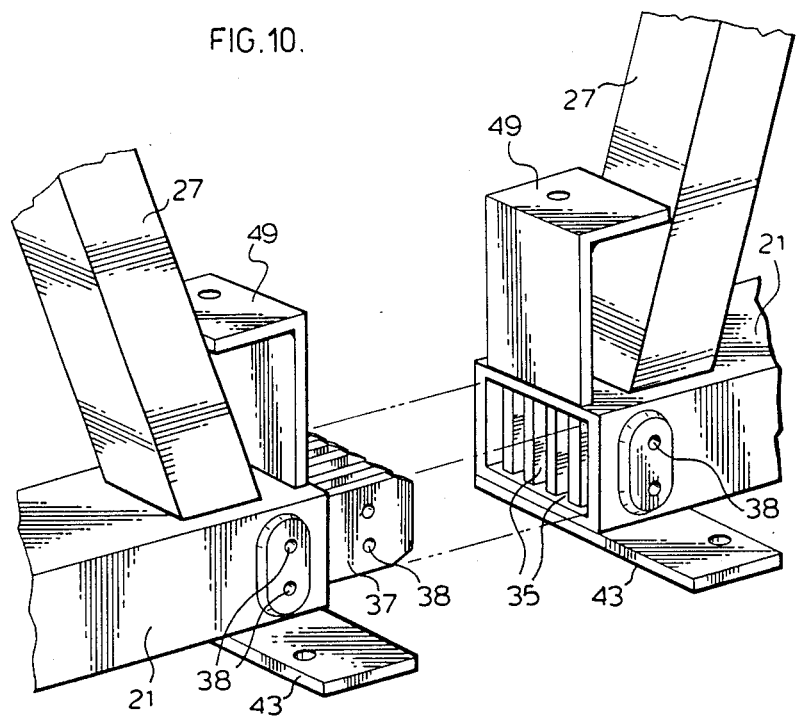
FIG. 10 is a perspective view of the splice in partial assembly showing a floor beam connector in accordance with another aspect of the invention.
Figure 11:
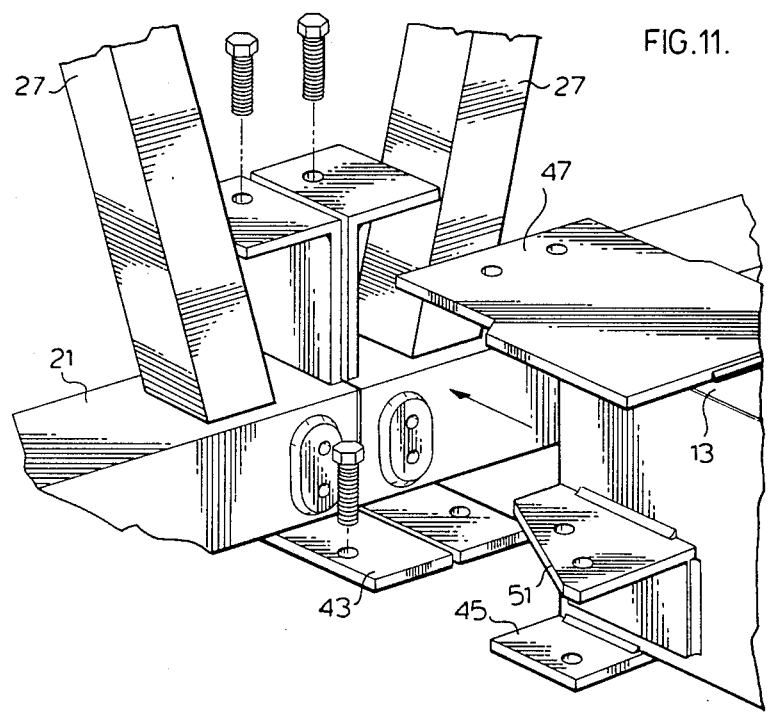
FIG. 11 is perspective view of the splice and floor beam connector of FIG. 10 showing the method of connecting the floor beam.
Figure 12:
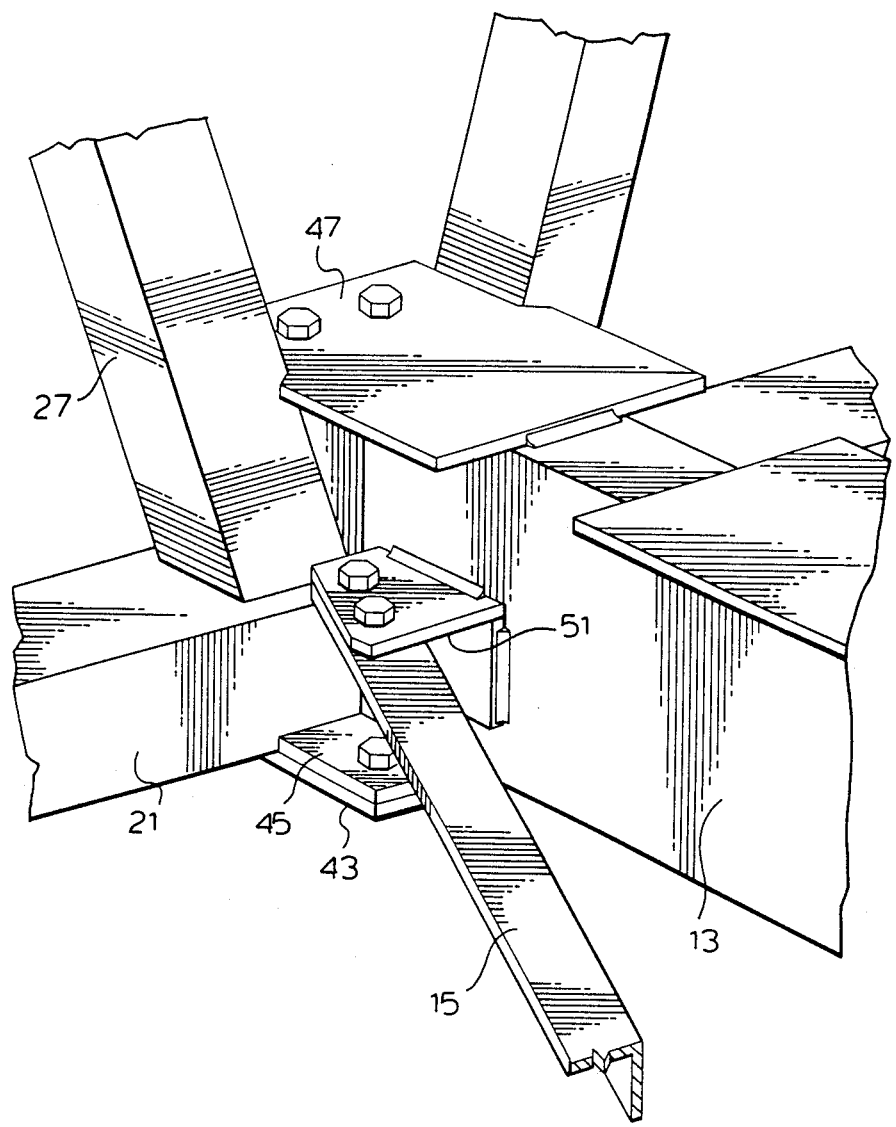
FIG. 12 is a perspective view of he floor beam connection of FIG. 11 fully assembled.

Turning now to FIGS. 10, 11 and 12, the floor beam connector is shown comprising horizontal support members 43 extending from respective ends of chord members 21 at splice 25 for supporting beam 13. The pair of horizontal support members 43 combine to form two halves of the support for beam 13 when the splice 25 is fully assembled.

As shown best with reference to FIGS. 11 and 12, beam 13 includes a first pair of flanges 45 having holes therein adapted to align with corresponding holes in the respective support members 43. In addition, outermost ones of support plates 19 on the beams 13 include an additional transverse extending flange 47 (FIG. 3) having a pair of holes therein adapted to align with respective holes in corresponding additional horizontal support members 49. An additional pair of flanges 51 extend from opposite sides of beam 13 for supporting cross members 15 (FIGS. 11 and 12).

Thus, in final assembly the center load of floor beams 13 are supported equally by horizontal support members 43 and 49 of respective adjacent chord members 21. Accordingly, a maximum dimension of floor beam 13 may be accommodated irrespective of the width of the bridge. By way of contrast, know prior art floor beam connections require multiple welded connections of the floor beam to support structures extending from the chord because the load of the beam does not in such prior art systems translate to the center of the chord splice.

Accordingly, an important aspect of the present invention is the improved lateral support provided by the interlocking finger connection of splice 25 in combination with horizontal members 43 and 49 for supporting equal portions of the load exhibited by floor beam 13.

Preferably, all metallic structural components of the pedestrian bridge 1 in accordance with present invention are hot dip galvanized prior to assembly, for forming an aesthetically pleasing and scratch resistant surface.

Other embodiments and variations of the present invention are contemplated.

For example, the interlocking finger splice of the present invention may be advantageously applied to virtually any structure using hollow tubing. To that end, the inventive splice could be used in such diverse applications as furniture construction, building construction, bridges, etc., any of which may be fabricated from stainless steel, plastic, or other suitable material.

Furthermore, whereas the preferred embodiment of the splice incorporates separate plates 31 which are manually installed and welded within slots 33 of adjacent chord members 21, it is contemplated that end portions of the chords 21 may be die cast in steel for prefabricating the ribs 31, and the prefabricated die cast block may then be welded onto the end of a standard section of hollow structural tubing.

As a further alternative, the rib and slot configuration of splice 25 may be fabricated via specialized machining tools from a solid block of steel.

Moreover, whereas the preferred embodiment discloses a splice for use with rectangular cross-sectional chord members 21, it is contemplated that the cooperating rib and slot aspect of the present invention may be applied equally to hollow tubing sections having square, circular or other cross-section.

All such embodiments or variations are believed to be within a sphere and scope of the present invention as defined by the claims appended hereto.

I claim:

1. A splice for connecting two ends of hollow tubing, comprising:
   (a) a plurality of ribs within each said two ends of hollow tubing for defining respective slots therewithin:
   (b) a plurality of plates adapted for insertion into said slots within each said two ends of hollow tubing; and
   (c) means for securing said plurality of plates within said respective slots, whereby said plurality of plates form an arrangement of interlocking fingers relative to said respective slots for providing a rigid connection between said two ends of hollow tubing.

2. A splice as defined in claim 1 wherein said means for securing further comprises:
   (d) a first at least two holes extending through one of said two ends of hollow tubing and corresponding ones of said plurality of ribs therewithin: ,
   (e) a second at least two holes extending through one end of each said plurality of plates, said second at least two holes being disposed so as to align with said first at least two holes upon insertion of said one end of said plurality of plates into said respective slots within said one of the two ends of hollow tubing;
   (f) a third at least two holes extending through the other one of said two ends of hollow tubing and corresponding ones of said plurality of ribs therewithin;
   (g) a fourth at least two holes extending through opposite ends of each said plurality of plates, said fourth at least two holes being disposed so as to align with said third at least two holes upon insertion of said other end of said plurality of plates into said respective slots within said other one of said two ends of hollow tubing;
   (h) a first at least two pins adapted for insertion through said first and second at least two holes; and
   (i) a second at least two pins adapted for insertion through said third and fourth at least two holes.

3. A splice as defined in claim 2 wherein each said plurality of plates tapers at said one and said opposite end thereof for facilitating easy insertion of said plurality of plates into said respective slots within each said two ends of hollow tubing.

4. A splice as defined in claim 1 wherein said plurality of ribs are in the form of individual plates adapted for insertion into respective machined apertures within each of said two ends of hollow tubing and individually welded therewithin.

5. A splice as defined in claim 1 wherein said plurality of ribs are embodied within a cast steel segments adapted to be welded to said each two ends of hollow tubing.

6. A splice as defined in claim 3 wherein each said plurality of plates are approximately 8 inches in length and approximately 31 inches in height and approximately ⅜ inches thick.

7. A splice as defined in claim 3 wherein each said plurality of ribs are approximately 21 inches in length by approximately 4 inches in height and approximately 5/16 inches thick.

8. A splice as defined in claim 3 where each said holes is approximately ⅜ inches in diameter.

9. A modular bridge comprising:
   (a) two end modules adapted for connection to respective end footings;
   (b) a plurality of side railings adapted for modular interconnection in two parallel rows between said end modules; adjacent ones of said side railings being connected via respective interlocking splices;
   (c) a plurality of floor beams arranged orthogonally between said two rows of side railings; and
   (d) means for connecting respective ones of said floor beams to corresponding ones of said side railings, each said means for connecting comprising at least one horizontal support member extending from each said adjacent ones of said side railings at said interlocking splice for supporting a corresponding one of said floor beams thereacross, whereby each said side railings support a portion of the load of said corresponding floor beam along a centre line at said respective interlocking splices yielding high lateral stability of said floor beam.

10. A modular bridge as defined in claim 9, wherein each said interlocking splices further comprises:
    (e) a plurality of ribs disposed within respective ends of said adjacent ones of said side railings for defining respective slots therewithin:
    (f) a plurality of plates adapted for insertion into said respective slots; and
    (g) means for securing said plurality of plates within said respective slots, whereby said plurality of plates form an arrangement of interlocking fingers relative to said respective slots for providing a rigid connection between said side railings.

* * * * *